(12) United States Patent
Herson et al.

(10) Patent No.: US 11,854,136 B2
(45) Date of Patent: Dec. 26, 2023

(54) MONITORING A SCENE TO ANALYZE AN EVENT USING A PLURALITY OF IMAGE STREAMS

(71) Applicant: Verizon Patent and Licensing Inc., Basking Ridge, NJ (US)

(72) Inventors: Andrew W. Herson, Albany, CA (US); Destah Owens, Tracy, CA (US); Mohammad Naimur Rahman, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 220 days.

(21) Appl. No.: 17/247,719

(22) Filed: Dec. 21, 2020

(65) Prior Publication Data

US 2021/0110711 A1    Apr. 15, 2021

Related U.S. Application Data

(63) Continuation of application No. 16/433,615, filed on Jun. 6, 2019, now Pat. No. 10,885,775.

(51) Int. Cl.
| | |
|---|---|
| *G06K 9/00* | (2022.01) |
| *G06T 13/20* | (2011.01) |
| *G08G 1/01* | (2006.01) |
| *G06N 20/00* | (2019.01) |
| *G06T 15/08* | (2011.01) |

(Continued)

(52) U.S. Cl.
CPC ............. *G06T 13/20* (2013.01); *G06N 20/00* (2019.01); *G06T 15/08* (2013.01); *G06V 20/54* (2022.01); *G08G 1/0133* (2013.01); *G08G 1/164* (2013.01); *G08G 1/166* (2013.01)

(58) Field of Classification Search
CPC ...... G08G 1/0133; G08G 1/164; G08G 1/166; G08G 1/0116; G08G 1/0129; G08G 1/0145; G08G 1/04; G06N 20/00; G06N 3/08; G06N 3/0454; G06T 15/08; G06T 2207/10016; G06T 2207/30236; G06T 2207/30241; G06T 7/246; G06T 7/292; G06T 13/20; G06V 20/13; G06V 20/54
See application file for complete search history.

(56) References Cited

U.S. PATENT DOCUMENTS

| | | | |
|---|---|---|---|
| 2018/0365888 A1* | 12/2018 | Satzoda | G06V 20/56 |
| 2020/0053286 A1* | 2/2020 | Corona | G06T 7/20 |

(Continued)

*Primary Examiner* — Xin Jia

(57) ABSTRACT

A simulation platform may receive, from a plurality of image capture devices, a plurality of image streams that depict an event. The simulation platform may identify an object that is depicted in each of the plurality of image streams. The simulation platform may determine, for each of the plurality of image streams, respective image-based coordinates of a path associated with the object during the event. The simulation platform may determine, based on the respective image-based coordinates and timestamps of the plurality of image streams, simulation coordinates associated with a path of the object during the event. The simulation platform may detect, based on the simulation coordinates, that the object is involved in a collision during the event. The simulation platform may perform an action associated with detecting that the object is involved in the collision.

20 Claims, 8 Drawing Sheets

(51) Int. Cl.
    *G08G 1/16*    (2006.01)
    *G06V 20/54*    (2022.01)

(56) References Cited

U.S. PATENT DOCUMENTS

2020/0272839 A1*   8/2020   Seo ..................... G06F 16/434
2020/0401821 A1*  12/2020   Roeder ............... G06V 40/103

* cited by examiner

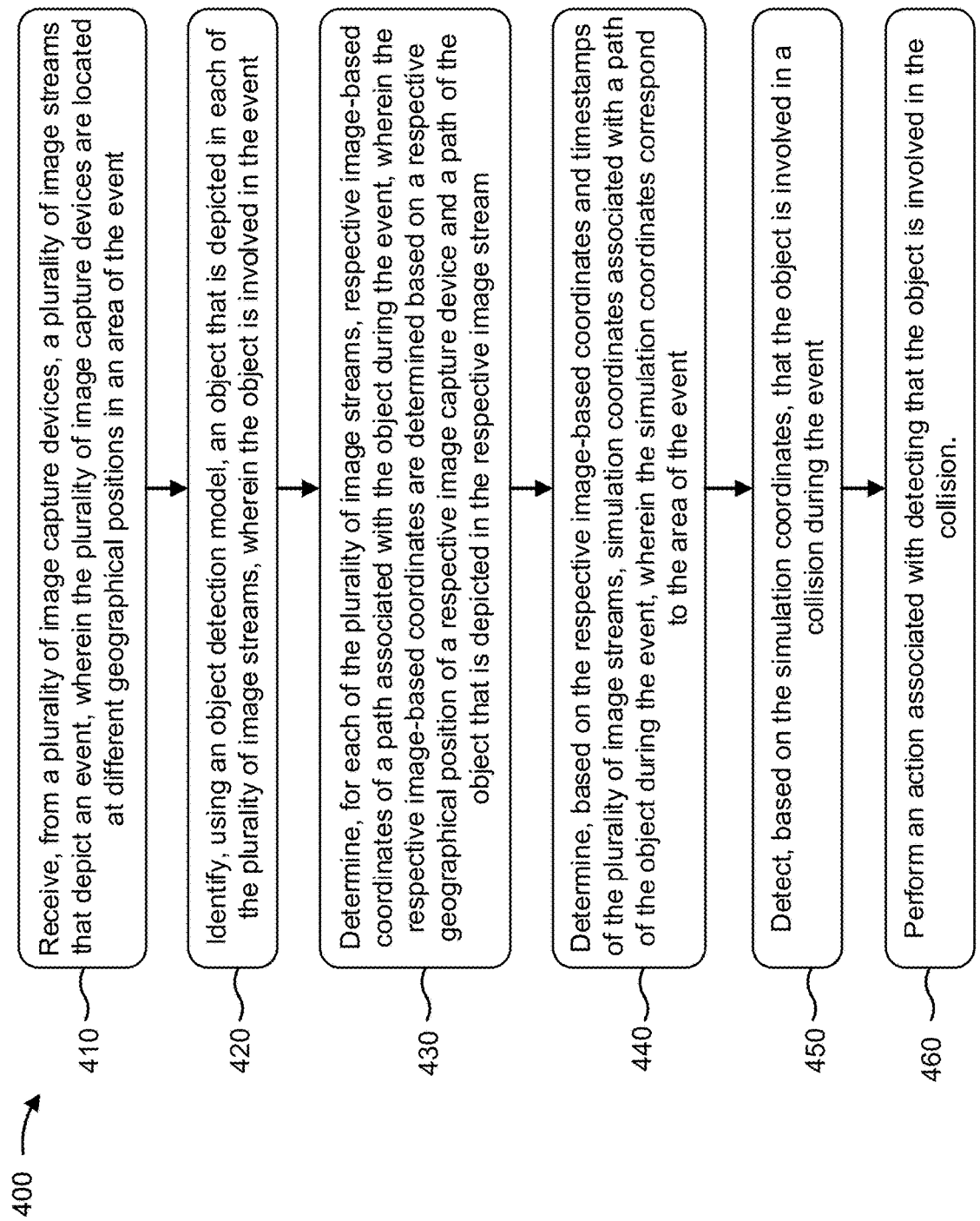

MONITORING A SCENE TO ANALYZE AN EVENT USING A PLURALITY OF IMAGE STREAMS

RELATED APPLICATION

This application is a continuation of U.S. patent application Ser. No. 16/433,615, entitled "MONITORING A SCENE TO ANALYZE AN EVENT USING A PLURALITY OF IMAGE STREAMS," filed Jun. 6, 2019 (now U.S. Pat. No. 10,885,775), which is incorporated herein by reference.

BACKGROUND

Image capture devices (e.g., cameras and/or devices associated with cameras) can capture images of one or more scenes (e.g., environments, locations, etc.) and generate image streams (e.g., video) that can be streamed to and/or recorded by one or more devices. For example, a surveillance camera (e.g., a traffic camera, security camera, a doorbell camera, and/or the like) can be used to record an event that occurs at a scene. In some cases, multiple surveillance cameras can be used to record the event from various positions (e.g., geographical positions, angles, orientations, etc.).

BRIEF DESCRIPTION OF THE DRAWINGS

FIG. 4 is a flow chart of an example process for monitoring a scene to analyze an event using a plurality of image streams.

DETAILED DESCRIPTION OF PREFERRED EMBODIMENTS

Figure 1A:
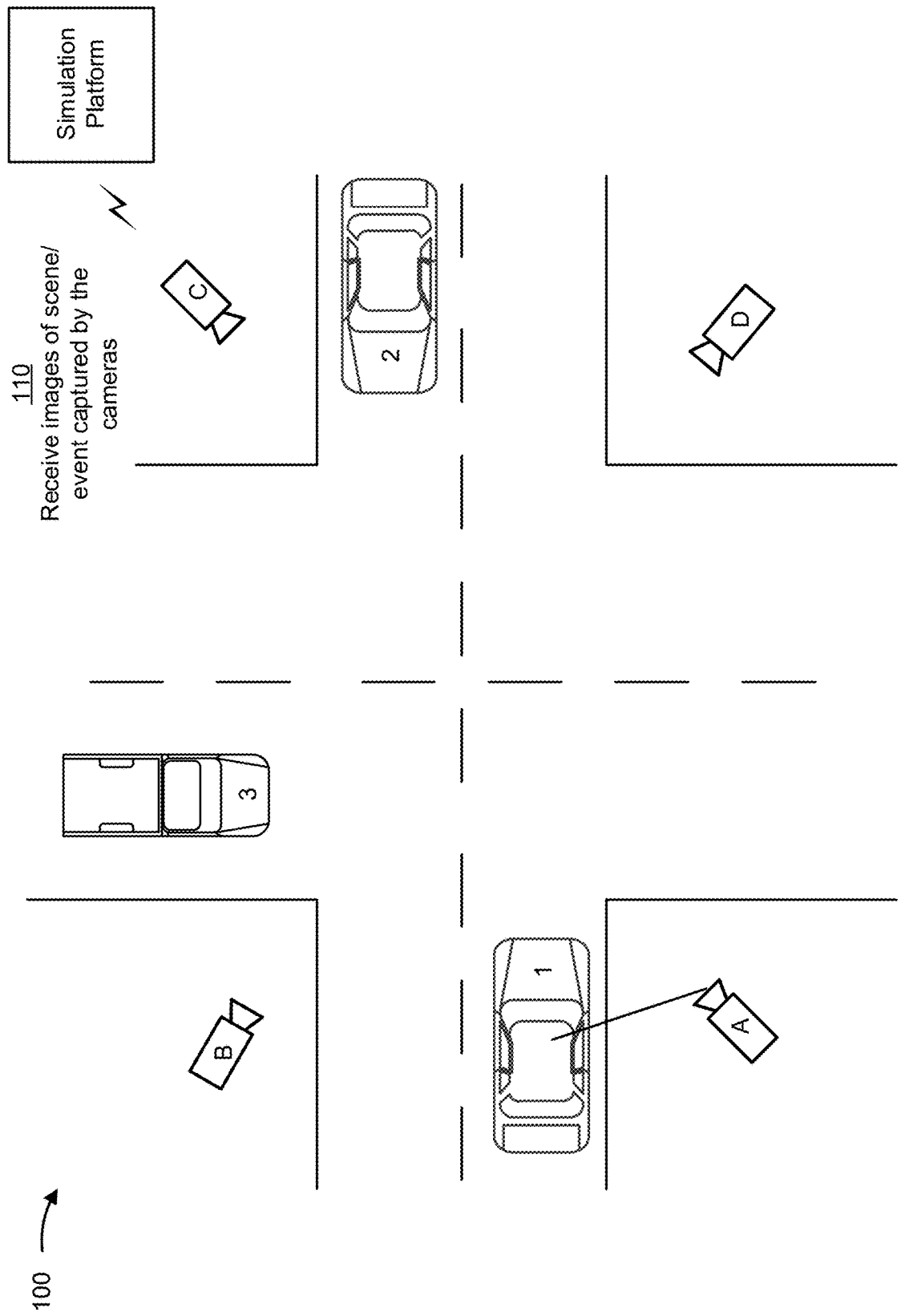
FIGS. 1A-1E are diagrams of an example implementation described herein.

The following detailed description of example implementations refers to the accompanying drawings. The same reference numbers in different drawings may identify the same or similar elements.

Image streams can be used to monitor a scene and/or can be played back to review an event that occurred at the scene. In some cases, one or more image analyses (e.g., computer vision techniques, such as edge detection, object detection, facial detection, and/or the like) can be performed on image streams to detect and/or analyze the events. In many instances, several different image capture devices may be configured around a scene to enable an event to be captured from different locations (e.g., geographical locations) and/or angles. However, unless the image capture devices are in certain positions to record an event (which might be impossible for that particular event, considering the image capture devices are in fixed positions), certain details of an event may not be detectable through analysis of the image streams using the one or more image analyses. Accordingly, in such cases, computing resources (e.g., memory resources, processing resources, and/or the like) associated with receiving, processing, and/or presenting the images streams for analysis of an event may be wasted because the image streams cannot be used to properly analyze the event and/or detect certain details of the event.

As a rather specific example of using image streams for monitoring and/or analysis, with respect to traffic incidents (e.g., collisions involving a vehicle, traffic jams, and/or the like), unless an image capture device is in a position to capture images that clearly show the traffic incident, previous techniques cannot properly detect and/or determine details of the traffic incident (e.g., whether or not there was a collision, what caused the traffic jam, and/or the like). For example, such previous techniques may not account for blind spots of image capture devices (e.g., due to the image capture devices being in fixed locations). Furthermore, due to the image streams being unable to properly depict details of an event, relatively long periods (e.g., hours, days, weeks, and/or the like) of time may pass before determining that such an event has occurred. In the meantime, additional resources (e.g., computing resources, consumable resources (e.g., gasoline of vehicles involved in a traffic jam, wear and tear of the vehicles, and/or the like), and/or the like) can be wasted while proper authorities (e.g., rescue agencies, medical personnel, law enforcement, and/or the like) are being notified of the traffic incident (which may be done by a witness of the traffic incident) or until the traffic incident is resolved. Furthermore, safety and/or health of victims and/or bystanders may be at risk until the traffic incident is detected and/or properly handled by the proper authorities.

Some implementations described herein provide a simulation platform that is capable of detecting, in real-time, an event and/or determining, in real-time, characteristics of the event or a scene of the event by analyzing a plurality of image streams of the event. The simulation platform may combine information associated with the plurality of streams to detect the event. For example, the simulation platform may detect a same object depicted in multiple image streams (e.g., in at least two of the image streams), determine a path of the object within or through a scene (and/or relative to one or more objects in the scene), and determine whether the object was involved in one or more events or incidents.

As a more specific example, as described herein, the simulation platform, via an analysis of multiple image streams, may identify a vehicle traveling through an intersection, determine a path and/or speed of the vehicle through the intersection, and determine whether the vehicle is involved in a traffic incident (e.g., a traffic violation, a collision, traffic jam, and/or the like) based on the determined path and/or speed relative to characteristics of other vehicles or objects, in the intersection, that are similarly identified and/or analyzed. In some implementations, the simulation platform may determine details of the traffic incident by converting multiple sets of image-based coordinates (e.g., two-dimensional (2D) coordinates) into a set of simulation coordinates (e.g., three dimensional (3D) coordinates). Using simulation coordinates for respective objects in the intersection, the simulation platform may detect that the vehicle was involved in a traffic incident. For example, according to the simulation coordinates of the path and/or speed of the vehicle, the simulation platform may determine whether the vehicle (or one or more parts of the vehicle) is, according to the image streams, at a same location at a same point in time as another object (e.g., indicating a collision with the object), whether the vehicle traveled with speed through the intersection instead of stopping completely (e.g., indicating a traffic violation), whether the vehicle, along with one or more other vehicles, is not moving or is moving slowly (e.g., indicating a traffic jam), and/or the like.

Accordingly, some implementations described herein permit one or more image streams to be used to detect and/or analyze (e.g., in real-time) one or more events by determining paths and/or speed of objects (e.g., vehicles, individuals, and/or the like) in a scene based on a plurality of image streams depicting the objects in the scene. In this way, timely detection of the event may conserve one or more computing resources, consumable resources, and/or hardware resources by quickly and efficiently detecting the event and/or a specific incident associated with the event. Furthermore, some implementations described herein allow for effective use of image streams to permit an analysis of an event to be performed, regardless of whether the image streams clearly depict the event. Therefore, although certain image streams may not include a clear indication of a particular detail associated with an event or incident, the image streams may be used, as described herein, to detect the particular detail, and thus may not be a waste of computing resources (e.g., processing resources, memory resources, and/or the like) if stored, processed, and/or displayed for review.

As described herein, one or more artificial intelligence techniques, including machine learning, deep learning, neural networks, and/or the like can be used to identify one or more objects (e.g., vehicles, pedestrians, stationary objects in a scene, and/or the like) based on images of an event or a scene of the event, determine characteristics of the objects associated with the event, determine movement of the objects in connection with the event, detect a particular incident associated with the event, and/or the like.

Although some example implementations described herein refer to a simulation platform being used in connection with receiving and/or analyzing images associated with traffic and/or detecting vehicles within the images to analyze an event associated with the traffic, the simulation platform may be used in connection with analyzing images depicting any other type of environment and/or to detect any other types of objects (e.g., individuals, vegetation, landmasses, buildings, signs, projectiles, and/or the like) in the images to analyze any other type of event that occurs in the environment.

FIGS. 1A-1E are diagrams of an example implementation 100 described herein. FIGS. 1A-1E illustrate an example of a simulation platform being used to monitor, analyze, and/or provide information associated with an intersection (e.g., a roadway intersection). In example implementation 100, objects are shown as vehicles 1, 2, and 3 (referred to collectively herein as "the vehicles") that are involved in an event (e.g., a traffic event that involves a particular traffic incident) within a scene (e.g., an intersection). Example implementation 100 includes an image capture system that provides, to the simulation platform, image streams of the scene to enable the simulation platform to detect the vehicles within and/or approaching the intersection. The image capture system may include a plurality of image capture devices (shown as Cameras A, B, C, and D), which may be referred to herein as "the cameras." In some implementations, the cameras may (e.g., according to instructions associated with the simulation platform) capture images and/or generate image streams in a same manner (e.g., at a same frame rate, a same resolution, a same aspect ratio, and/or the like).

As described herein, the simulation platform may receive and/or determine metadata associated with the vehicles to determine respective paths of the vehicles (e.g., based on depicted movement of the vehicles in the image streams) and/or whether a traffic incident occurred based on the respective paths of the vehicles. In some implementations, as shown in FIG. 1E, the simulation platform, based on the determined paths of the vehicles, may generate a simulation (e.g., a 3D simulation) of a detected traffic event and/or traffic incident based on the determined paths to permit the traffic incident and/or traffic event to be analyzed in three dimensions.

As shown in FIG. 1A, and by reference number 110, the simulation platform receives images of the scene and/or event that are captured by the cameras. For example, the simulation platform may receive images from the cameras. The cameras may be set up to capture (e.g., continuously during a particular time period) the images of the scene (e.g., an area, a location, and/or the like). Additionally, or alternatively, the cameras may be configured to capture particular events in the scene using one or more sensors (e.g., motion sensors, infrared light sensors, temperature sensors, vibration sensors, microphones, and/or the like) to detect the particular events (e.g., based on detected movement, sounds, temperatures, and/or the like). The cameras may be positioned at various locations (e.g., geographical locations surrounding the scene) such that the image capture devices are configured to capture images of the scene from various positions (e.g., with different geographical locations, different orientations, different angles and/or different views). Each of the cameras may provide the one or more images within an image stream (e.g., similar to a video surveillance camera, an internet protocol (IP) camera, and/or the like). The image stream may include image data that is provided to the simulation platform (e.g., if the simulation platform is colocated with one or more of the image capture devices) and/or sent over one or more networks (e.g., a LAN, a WAN, the Internet, and/or the like). The one or more images of the image stream may be sequentially provided in time, rather than groups of the one or more images being provided at once or as one set of image data.

The simulation platform may analyze the image streams immediately (e.g., in real-time or as the image streams are received), and/or save the image streams (e.g., to a storage device) as video data for later access or analysis. As described herein, the cameras may include one or more sensors that are utilized to capture the images of the image streams. For example, the image capture devices may detect motion in the scene (e.g., an individual walking in the scene, one or more of the vehicles passing through the scene, and/or the like) and begin capturing images based on detecting the motion.

In this way, the simulation platform may receive image streams captured by the cameras to permit the simulation platform to identify the vehicles in the image streams and/or determine one or more characteristics of the vehicles based on the image streams depicting the vehicles in the scene.

Figure 1B:
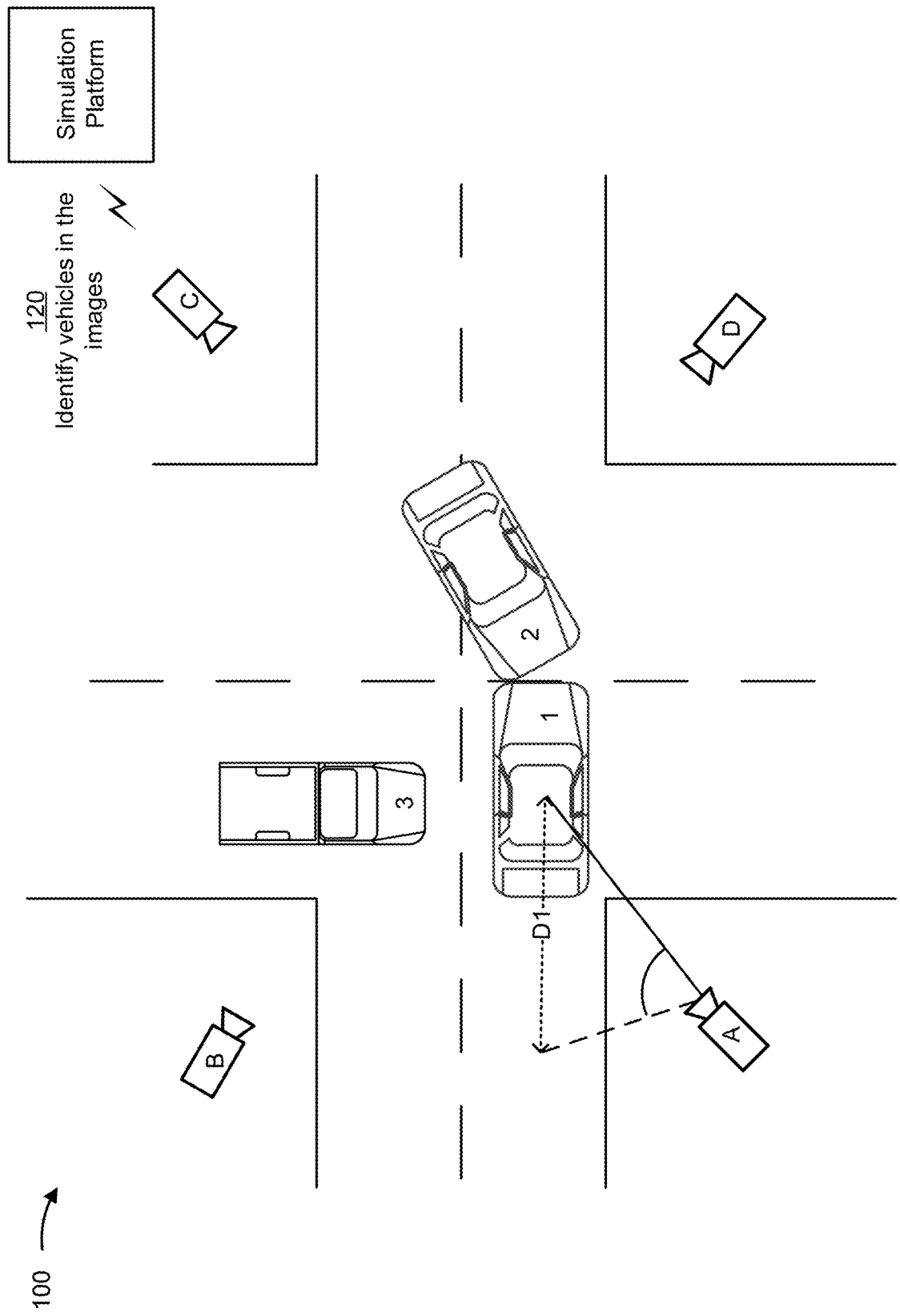

As shown in FIG. 1B, and by reference number 120, the simulation platform identifies the vehicles in the images. For example, the simulation platform may identify the vehicles in one or more image streams associated with the cameras A, B, C, D (which may be referred to herein individually as "image stream A," "image stream B," "image stream C," and "image stream D," respectively, or collectively as "the image streams" and/or "the plurality of image streams") using an object detection model. The object detection model may use a computer vision technique (e.g., an edge detection analysis, a motion detection analysis, and/or the like) that compares frames of respective image streams and determines that one or more objects (in this case, the vehicles) are moving through the intersection.

In some implementations, the simulation platform may use a computer vision technique, such as a convolutional neural network technique to assist in classifying image data (e.g., data relating representations of objects) into a particular class. For example, the simulation platform may determine that an object has one or more characteristics. Such characteristics may include determining whether the object is a vehicle, individual, inanimate object, projectile, and/or the like. Furthermore, such characteristics may include identifying a type of the object (e.g., type of vehicle (compact car, sedan, truck, and/or the like) or make/model of vehicle, type of pedestrian (e.g., walker, jogger, skateboarder, cyclist, and/or the like), type of projectile (e.g., ball, pole, and/or the like), and/or the like. Such characteristics may be determined based on identifying and/or analyzing a shape, a size, movement characteristics, and/or the like of the object. On the other hand, the simulation platform may determine that an object does not have a particular characteristic. In some cases, the computer vision technique may include using an image recognition technique (e.g., an Inception framework, a ResNet framework, a Visual Geometry Group (VGG) framework, and/or the like), an object detection technique (e.g. a Single Shot Detector (SSD) framework, a You Only Look Once (YOLO) framework, and/or the like), an object in motion technique (e.g., an optical flow framework and/or the like), and/or the like.

In some implementations, as described herein, the simulation platform may determine whether an object can be identified within one or more images of a scene or event. For example, using information and/or images associated with a particular object, the simulation platform may determine whether an image includes the particular object. In this case, the simulation platform may generate and/or utilize a machine learning model, such as an object detection model. For example, the simulation platform may train the object detection model using information and/or images that include a plurality of various objects, a plurality of various characteristics of various objects, and/or the like, to enable similar objects to be identified and/or detected within images (e.g., images from the cameras).

In some implementations, the simulation platform may use a scoring system (e.g., with relatively high scores and/or relatively low scores) to identify and/or classify objects as being associated with one another. More specifically, the simulation platform may determine that past characteristics of certain objects have a threshold probability of being associated with a particular object. In this case, the simulation platform may determine that a relatively high score (e.g., as being likely to be identified) is to be assigned to those characteristics that are determined to be the same or similar as previously identified characteristics of the particular object (or more frequently identified than past identified characteristics). In contrast, the simulation platform may determine that a relatively low score (e.g., as being unlikely to be identified) is to be assigned to characteristics of objects that are determined to be different than past identified characteristics of the particular object (or less frequently identified than past identified characteristics). Accordingly, the object detection model may include or may be a machine learning model that is trained to detect the vehicles of example implementation 100 based on historical information associated with detecting one or more other vehicles that are associated with the vehicle (e.g., vehicles that are a same make/model, vehicles that are a same type, and/or the like). For example, the machine learning model may be trained based on training images that depict a plurality of vehicles. In this way, the object detection model may be configured to detect vehicles depicted in the training images.

In some implementations, the simulation platform may determine whether a same object is depicted in multiple image streams based on detecting the object in one of the image streams. For example, the simulation platform may detect vehicle 1 in image stream A. Based on detecting vehicle 1 in image stream A, the simulation platform may determine whether vehicle 1 is depicted in one or more of image stream B, image stream C, and/or image stream D by analyzing image stream B, image stream C, and/or image stream D to detect an object with corresponding movement characteristics as vehicle 1 (e.g., same direction, speed, location, and/or the like). In this way, the simulation platform (and/or an object detection model) may quickly and/or efficiently identify whether a same object is in multiple streams by using movement characteristics of objects relative to analyzing visual images of the objects in the image streams. For example, using movement characteristics to identify that a same object is in multiple image streams (e.g., during a same time period associated with the image streams) may utilize relatively fewer computing resources (e.g., processing resources, memory resources, and/or the like) than performing an image processing analysis that may involve comparing images from each of the image streams that may depict the objects to determine that the objects are the same based on appearance and/or likeness.

In this way, the simulation platform may identify objects within image streams (e.g., the same objects within different image streams) to permit the simulation platform to determine characteristics (e.g., movement characteristics) of the objects.

Figure 1C:
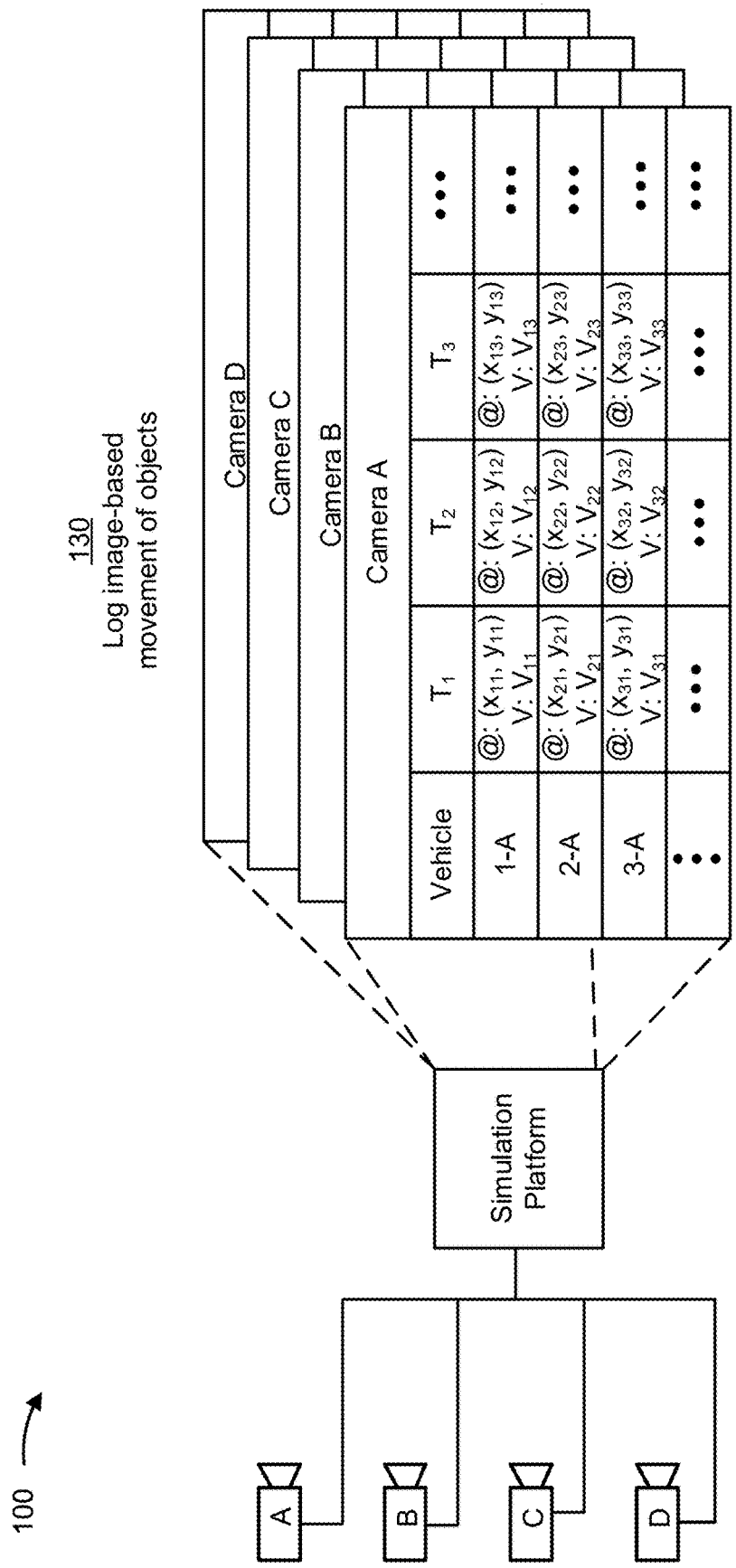

As shown in FIG. 1C, and by reference number 130, the simulation platform logs image-based movement of the objects. For example, for each of the image streams, the simulation platform may track the location of a detected object (in this case, vehicles 1, 2, and 3) through images (or frames) of the image stream. The simulation platform may track the location using 2D coordinates that are based on a frame location of the object within the images (e.g., a location of the object defined by (x, y) coordinates of the images of the image stream).

Additionally, or alternatively, the simulation platform may track the location based on the location (e.g., geographical location) of the camera that captures the images of the image stream (e.g., in a similar manner used to determine movement characteristics of the object, as described above). For example, the simulation platform may convert a frame location of the object within an image of the image stream to estimated geographical coordinates of the object based on the location of the camera. In such cases, the simulation platform may receive (e.g., in association with the image streams) metadata that identifies the corresponding geographical locations of the respective cameras. Accordingly, using a geographical location of a camera and coordinates for frame locations of the object within images captured by the camera, the simulation platform may determine estimated geographical coordinates (e.g., corresponding to potential geographical (x, y) coordinates) of the object. However, such geographical coordinates may not correspond to actual geographical coordinates of the object because the image stream may not provide adequate depth perception to permit the simulation platform to determine the actual geographical location of the object (e.g., because an object moving toward or away from a camera capturing images of the object may not appear to be moving in the images). As described herein, the estimated geographical coordinates for one image stream can be combined with estimated geographical coordinates calculated based on movement characteristics of the object detected from another image stream to determine more accurate geographical coordinates of the object (e.g., geographical coordinates that are nearer the actual geographical coordinates of the object). In this way, the simulation platform may determine and/or calculate 2D coordinates of an object to track image-based movement of the object through a scene and/or during an event.

According to some implementations, when an object is detected in an image stream, the simulation platform may assign an identifier to the object to permit logging of the image-based movement of the object according to that image stream. Accordingly, as shown by mappings for the cameras in FIG. 1C, based on the simulation platform detecting the vehicles, the simulation platform may assign respective identifiers to the vehicles (or any other objects detected in the scene of example implementation 100). As shown, for image stream A, the simulation platform may assign vehicle 1 to identifier "1-A," vehicle 2 to identifier "2-A," and vehicle 3 to identifier "3-A." Correspondingly, similar identifiers may be assigned to the vehicles for image streams B, C, D (e.g., 1-B, 2-B, 3-B, 1-C, 2-C, 3-C, 1-D, 2-D, 3-D, and/or the like). Further, as shown in the mapping for image stream A, the simulation platform maps determined image-based coordinates associated with the movement of the vehicles using the identifiers for the vehicles.

Accordingly, from individual analyses of the image streams, the simulation platform tracks the image-based movement of the vehicles of example implementation 100. The image-based movement for a vehicle i (where i=1, 2, 3, . . . ) may be tracked by recording, at various times t (shown as $T_1$, $T_2$, $T_3$, . . . ), movement characteristics of the vehicle i. The example movement characteristics may include coordinates ($@_{it}$) and an estimated speed ($V_{it}$) of the vehicle i. The coordinates ($@_{it}$) of FIG. 1C may be 2D coordinates corresponding to a frame location of the vehicles within images captured at times t, 2D coordinates corresponding to estimated geographical coordinates of the vehicles determined from images captured at times t, and/or the like. The estimated speed ($V_{it}$) may be calculated based on an estimated distance that the vehicle i traveled between images captured at times t. Additionally, or alternatively, the simulation platform may determine a direction of travel of the object based on the difference in the location of the object according to the coordinates. The direction of travel may be relative to a frame of the image stream and/or a geographical direction. It should be noted that tracked movement characteristics for vehicles 1, 2, and 3 may be different in each of the mappings of FIG. 1C. For example, a mapping for vehicle 1 in the mapping for image stream A may be different (e.g., include different coordinates and/or different speeds at the same times) than a mapping for vehicle 1 for image stream B.

According to some implementations, the simulation platform may receive metadata associated with the image streams that includes the movement characteristics of the vehicles. For example, an object detection model may be associated with a platform that is separate from the simulation platform. In such cases, the simulation platform may receive, from the object detection model, the movement characteristics as metadata associated with the vehicles to permit the simulation platform to log the movement characteristics in the mappings of FIG. 1C. Additionally, or alternatively, the metadata may further include geographical position information associated with the cameras (e.g., to permit the simulation platform to convert the movement characteristics to geographical coordinates, as described herein).

In this way, the simulation platform may log image-based movement for each of the image streams to permit the simulation platform to synchronize the image streams, identify that a same object is in multiple image streams, and/or determine simulation coordinates of the object based on the object being identified in the multiple streams.

Figure 1D:
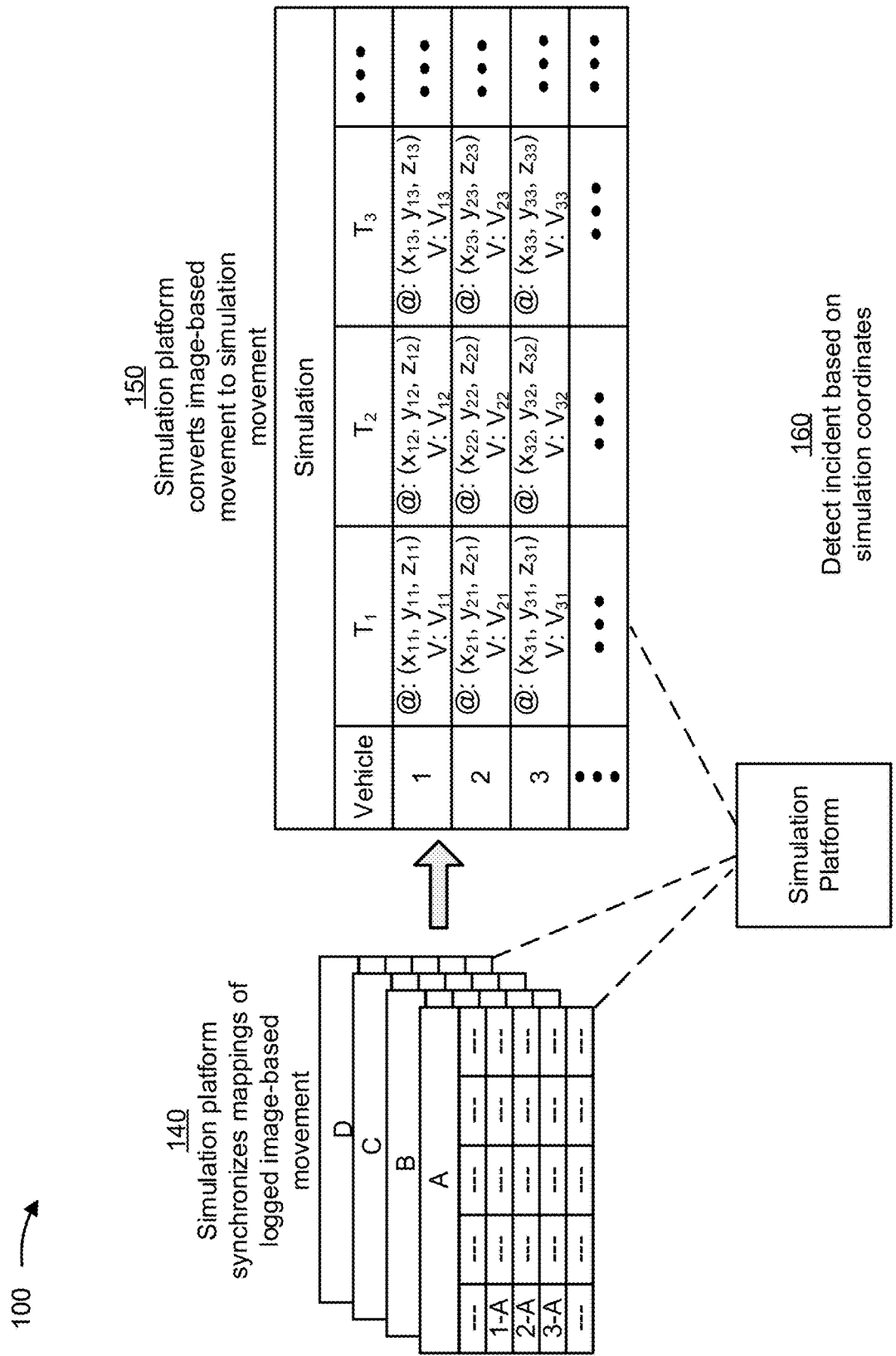
Figure 1E:
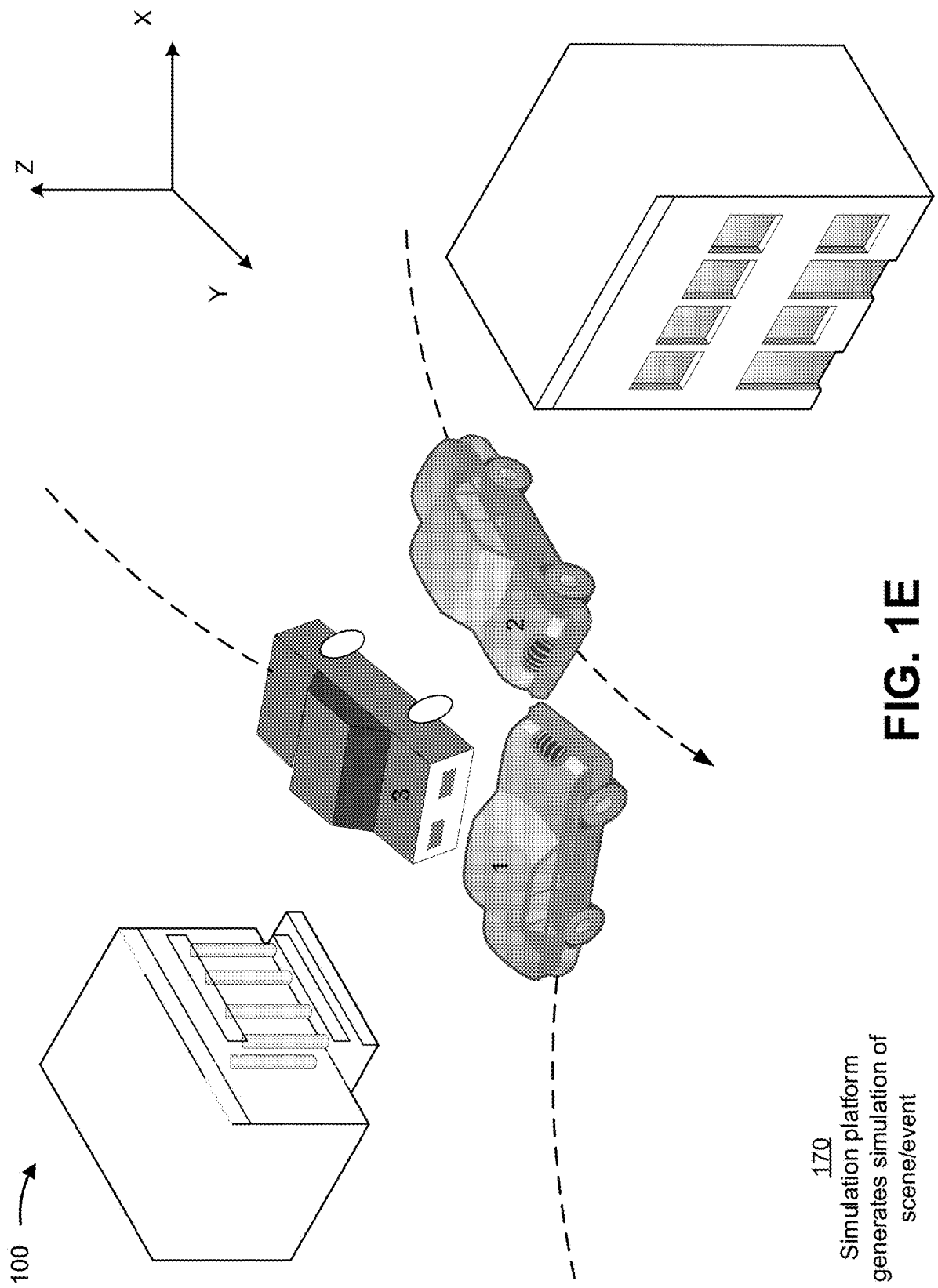

As shown in FIG. 1D, and by reference number 140, the simulation platform synchronizes the mappings of the logged image-based movement for the image streams. In some implementations, the simulation platform may synchronize the image-based coordinates according to timestamps (e.g., corresponding to times t) associated with the image streams. Accordingly, the simulation platform may align movement characteristics of the vehicles to one or more same time periods of an event involving the vehicles. Furthermore, the simulation platform may analyze and/or compare movement characteristics of any or all vehicles identified in the image streams to permit the simulation platform to determine whether the vehicles (or any other objects) in the mappings are the same vehicles or objects.

In some implementations, when synchronizing the mappings, the simulation platform may map an object identified in a first image stream to an object logged in a second stream. For example, the simulation platform may determine whether vehicle 1-A in image stream A corresponds to a vehicle depicted in one or more of image streams B, C, or D based on movement characteristics of vehicle 1 and movement characteristics of other vehicles in the other image streams according to the images of the respective image stream. For example, the simulation platform may determine a speed and/or geographical direction of travel of vehicle 1-A according to image stream A based on geographical coordinates of the camera A. As shown, the simulation platform may determine a distance traveled or a path (shown as "D1" in FIG. 1B). The simulation platform may determine speed and/or direction of travel of vehicle 1-A along D1 using image stream A.

As described herein, the simulation platform may determine the speed and/or direction of travel based on the position of camera A, the determined proximity of camera A to vehicle 1-A (e.g., based on determined size and/or shape of vehicle 1-A according to an edge analysis of images of image stream A that depict vehicle 1), the movement characteristics for vehicle 1-A in the mapping for image stream A, a length of time that passes between the events of FIG. 1A and the events of FIG. 1B, a measured angle (as illustrated in FIG. 1B) between the starting point of vehicle 1-A in FIG. 1A and the endpoint of vehicle 1-A in FIG. 1B, and/or the like. Accordingly, the simulation platform (and/or object detection model) may detect movement characteristics of an object in a single image stream (e.g., image stream A) and determine whether one or more other image streams (e.g., image stream B, image stream C, and/or image stream D) depict an object with similar movement characteristics relative to geographical positions from which the one or more other image streams are captured.

Correspondingly, to determine whether the vehicle 1-A is in one or more of image streams B, C, and D, the simulation platform may identify whether movement characteristics of an object that are logged in mappings for image streams B, C, and D is moving in a same or similar direction and/or at a same or similar speed as indicated by the movement characteristics for vehicle 1-A in the mapping for in image stream A. Accordingly, for example, assume that the mapping for image stream B includes movement characteristics for an object identified as "vehicle 4-B." In such an example, if the movement characteristics for vehicle 4-B indicate that vehicle 4-B is traveling through the intersection at a similar speed and in a same geographical direction as the simulation platform determines vehicle 1-A to be traveling according to image stream A, the simulation platform may determine that vehicle 4-B is a same vehicle as vehicle 1-A. Furthermore, the simulation platform may map vehicle 4-B to vehicle 1-A by assigning a same identifier (e.g., "vehicle 1") to vehicle 4-B and vehicle 1-A when synchronizing the mappings. Accordingly, the simulation platform may determine that vehicle 1 is in both image stream A and image stream B to permit the simulation platform to use image-based coordinates associated with both image stream A and image stream B to determine simulation coordinates for vehicle 1.

In this way, the simulation platform may synchronize the mappings of the image-based coordinates to permit the simulation platform to identify the same objects in multiple streams and determine simulation coordinates from image-based coordinates associated with the multiple streams.

As further shown in FIG. 1D, and by reference number 150, the simulation platform converts the image-based movement to simulation movement. For example, the simulation platform may combine (e.g., via summing, via calculating an average or weighted average, and/or the like) the image-based coordinates in any suitable manner to generate the simulation coordinates. In some implementations, image-based coordinates associated with the image streams may be normalized so that the image-based coordinates can be compared and/or utilized relative to a same scale or system. For example, the image-based coordinates may be converted to a coordinate system (e.g., geographical coordinates associated with the scene or an area of the scene), as described herein (e.g., based on geographical locations of the cameras and the movement characteristics of the vehicles). The coordinate system may be based on an area of the scene (e.g., an area of the intersection), a 3D space of the scene (e.g., a 3D space, associated with the intersection, that includes buildings, structures, objects, terrain, and/or the like), and/or the like. In this way, the image-based coordinates may be combined to generate simulation coordinates based on the normalized image-based coordinates.

As shown, the simulation coordinates generated from the image-based coordinates may be 3D coordinates. For example, a set of image-based coordinates from two or more image streams can be combined with geographical position information. The geographical position information may include geographical coordinates and/or altitude information. The altitude information may provide a third dimension associated with a 2D image to permit 3D coordinates to be determined and/or generated from the altitude information and the 2D image. For example, the altitude information of Camera A and the altitude information for Camera B may be combined with image-based coordinates for vehicle 1 associated with image stream A and image stream B to generate 3D simulation coordinates for vehicle 1. In this way, a path of vehicle 1, and correspondingly paths of vehicle 2 and vehicle 3, can be determined in three dimensions through the scene and/or during the event.

Accordingly, as described herein, the simulation platform, using image-based coordinates of objects in image streams and/or geographical position information of image capture devices that capture the image streams, can generate simulation coordinates of the objects to determine whether one or more of the objects are involved in a particular incident.

As further shown in FIG. 1D, and by reference number 160, the simulation platform may detect an incident (e.g., a traffic incident) based on the simulation coordinates. In some implementations, the simulation platform may detect the incident in real-time during an event at a scene. For example, in example implementation 100, the simulation platform may be monitoring real-time image streams from the cameras to detect a potential incident between the vehicles. In some implementations, the simulation platform may detect an incident from the simulation coordinates by determining paths of objects through a scene using the simulation coordinates. For example, a path of vehicle 1 may correspond to a line that connects the determined simulation coordinates for vehicle 1. Accordingly, the simulation platform may determine the path of travel of vehicle 1 (and correspondingly, paths of travel for vehicle 2 and vehicle 3) through the intersection of example implementation 100.

To detect an incident, the simulation platform may be configured to monitor whether simulation coordinates for a particular object indicate that the object was within a threshold distance of another object. For example, in example implementation 100, the simulation platform may be configured to monitor whether the distance between vehicles 1, vehicle 2, and/or vehicle 3 is within a threshold distance (e.g., a distance that indicates that a collision occurred and/or nearly occurred). The simulation platform may determine the distance between the vehicles by determining the differences between the simulation coordinates for the vehicles at particular times t of the event. If a difference between simulation coordinates for at least two of the vehicles (e.g., vehicle 1 and vehicle 2) at a particular time are within a threshold distance (e.g., a threshold collision distance), the simulation platform may detect that an incident occurred (e.g., a collision between vehicle 1 and vehicle 2). Additionally, or alternatively, the simulation platform may analyze the paths of the vehicles to determine whether at least two of the paths include a point of intersection. Furthermore, the simulation platform may determine, if there is a point of intersection between two paths (e.g., between paths of vehicle 1 and vehicle 2), the simulation platform may determine whether the vehicles associated with the two paths were within a threshold distance of the point of intersection at a same time t. Accordingly, the simulation platform may detect an incident using points of intersection of paths determined from the simulation coordinates.

The simulation platform may be configured to detect certain types of incidents. For example, in example implementation 100, the simulation platform may be configured to detect a collision involving a vehicle, a traffic jam, a traffic violation, and/or the like. Furthermore, the simulation platform may be configured to detect characteristics of a particular incident. For example, the simulation platform may determine whether a collision involved multiple vehicles, a single vehicle, a pedestrian, and/or the like. Additionally, or alternatively, the simulation platform may detect a number of vehicles involved in a traffic jam, a source (or beginning of the traffic jam whether vehicles are having to begin to travel slowly), timing associated with the traffic jam (e.g., a length of time that a vehicle is in the traffic jam), and/or the like. In some implementations, the simulation platform may determine a particular type of traffic violation, such as the traffic violation involved a vehicle not stopping for a stop sign or traffic light, a vehicle parking in a no parking zone, and/or the like. In such cases, the simulation platform may have access to simulation coordinates that are associated with the traffic violation (e.g., simulation coordinates of entries to the intersection for the stop sign or stop light, simulation coordinates of the no parking zone, and/or the like).

Accordingly, as shown in FIG. 1B, the simulation platform may detect that vehicle 1 and vehicle 2 are involved in a collision (e.g., due to the difference between simulation coordinates of vehicle 1 and simulation coordinates of vehicle 2 indicating a distance that is within a threshold collision distance). Furthermore, in example implementation 100, the simulation platform may determine that vehicle 3 is involved in a traffic jam (or came to a stop) near the collision of vehicle 1 and/or vehicle 2 (e.g., due to none of the vehicles moving for a threshold period of time).

Therefore, as described herein, the simulation platform may determine that vehicle 1 and vehicle 2 are involved in a vehicle collision, though none of the cameras may have clear view of the physical contact between vehicle 1 and vehicle 2 (e.g., due to blind spots caused by the vehicles and/or other objects in the intersection). Therefore, though images from the cameras may not provide clear evidence of the collision, the simulation platform may detect, relatively more accurately than individually analyzing the images from the cameras, that the collision occurred.

In some cases, although the simulation platform may not detect a particular incident, the simulation platform, via generating the simulation coordinates, may permit details and/or information associated with a particular scene (e.g., intersection), event (e.g., traffic event), and/or incidents to be identified and/or analyzed to prevent future incidents from occurring. For example, the simulation platform may be configured to detect patterns of similar incidents occurring during a particular event and/or at a particular scene. Referring to example implementation 100, assuming vehicle 1 and vehicle 2 were not involved in a collision, but nearly collided, and/or that several similar near collisions have occurred at the intersection, the simulation platform may detect the several similar near collisions (by comparing the simulation coordinates of vehicle 1 and vehicle 2 to simulation coordinates for other vehicles on other occasions (e.g., other days, other times of a day, and/or the like) and send a notification to a user device of an entity to alert the entity that such near collisions have occurred. In this way, the entity may investigate or determine a reason that such near collisions keep occurring (e.g., faulty or hazardous timing associated with traffic light, improper or inadequate signage, and/or the like).

According to some implementations, the simulation platform may perform one or more actions based on detecting an incident. For example, based on detecting the collision between vehicle 1 and vehicle 2, the simulation platform may control a traffic control device (e.g., a traffic light, a roadside sign, and/or the like) in an area of the intersection. More specifically, the simulation platform may cause a traffic light at the intersection to display a hazard signal, or cause a sign along one or more of the roadways of the intersection to display a warning that a collision occurred in the upcoming intersection. In this way, the simulation platform may perform one or more actions to prevent further or secondary damage to one or more other vehicles or individuals in the area of the intersection.

Additionally, or alternatively, the simulation platform may generate and/or transmit a notification associated with the incident. For example, the simulation platform may send a notification to a user device associated with an entity (e.g., a user device associated with a medical agency, a law enforcement agency, a governmental agency, an insurance agency, and/or the like) to indicate that the collision occurred. In this way, the entity may take an appropriate action associated with the collision occurring, based on receiving the notification.

In this way, the simulation platform may detect an incident involving one or more objects at a scene and/or during an event.

As shown in FIG. 1E, and by reference number 170, the simulation platform may generate a simulation of the scene and/or event. The simulation may be generated and/or built from the simulation coordinates of identified objects in a scene and/or associated with in an event and/or incident. For example, the simulation platform may reenact the collision between vehicle 1 and vehicle 2 within a 3D environment using a 3D graphical simulation to enable details of the event to be detected and/or analyzed. In some implementations, the 3D graphical simulation may be generated to permit a user to have omnidirectional views of the reenacted event or incident within the graphical simulation. Accordingly, a user, via the 3D graphical simulation, may have access to a view of an event that is different from the views of the cameras.

In some implementations, the simulation platform may utilize one or more template graphics (e.g., template graphical representations of objects, vehicles, individuals, scenes, areas, buildings, landscapes, vegetation, and/or the like) to reenact the incident using the simulation coordinates of the objects. A template graphic may be a preconfigured graphic (e.g., a graphic that is not customized or generated in real-time to represent another object) that may represent multiple objects that have one or more similar characteristics. For example, the simulation platform may assign a template automobile graphic to vehicle 1 and vehicle 2 (which are classified by the simulation platform as automobiles) and a template truck graphic to vehicle 3 (which is classified by the simulation platform as a truck). Additionally, or alternatively, template graphics for structures, buildings, vegetation, and/or the like at the intersection can be included within the 3D simulation.

Accordingly, the simulation platform may generate the simulation and/or cause the simulation to be presented via a display device (e.g., a display of a user device, a monitor, a television, and/or the like). In some implementations, the simulation platform may build the simulation, store the simulation (e.g., for later presentation and/or review), transmit the simulation (e.g., to one or more user devices for display via the user devices), and/or the like. In some implementations, the simulation platform may detect one or more incidents via the graphical simulation. For example, if the simulation platform simulation coordinates indicate that the vehicle 1 and vehicle 2 were near each other (e.g., the measured distance between vehicle 1 and vehicle 2 was near the threshold distance), the simulation platform may determine that a collision has occurred based on the template graphics for vehicle 1 and vehicle 2 overlapping during the 3D graphical simulation. Accordingly, the 3D graphical simulation may be used to detect the collision.

In this way, the simulation platform may generate a 3D graphical simulation to permit an event or incident at a scene to be reenacted and/or analyzed.

Accordingly, as described herein, the simulation platform may enable an event and/or a specific incident of an event, to be detected regardless of whether the specific incident of the event was shown in captured images of the event. Furthermore, the simulation platform may detect the event in real-time relative to the event occurring, to conserve secondary resources (e.g., computing resources, consumable resources, hardware resources, and/or the like) that may be wasted in association with an extended period of time passing before proper authorities are notified that the event occurred. Moreover, further resources (e.g., computing resources, consumable resources, hardware resources, and/or the like) can be conserved by permitting a relatively more inclusive or thorough analysis (e.g., in three dimensions) of an event and/or incident to be performed in order to detect a source and/or cause of the event and/or incident. In this way, from such an analysis, proper action can be taken (e.g., by the proper authorities) to decrease the likelihood and/or prevent future or similar incidents from occurring.

As indicated above, FIGS. 1A-1E is provided as an example. Other examples can differ from what is described with regard to FIGS. 1A-1E.

Figure 2:
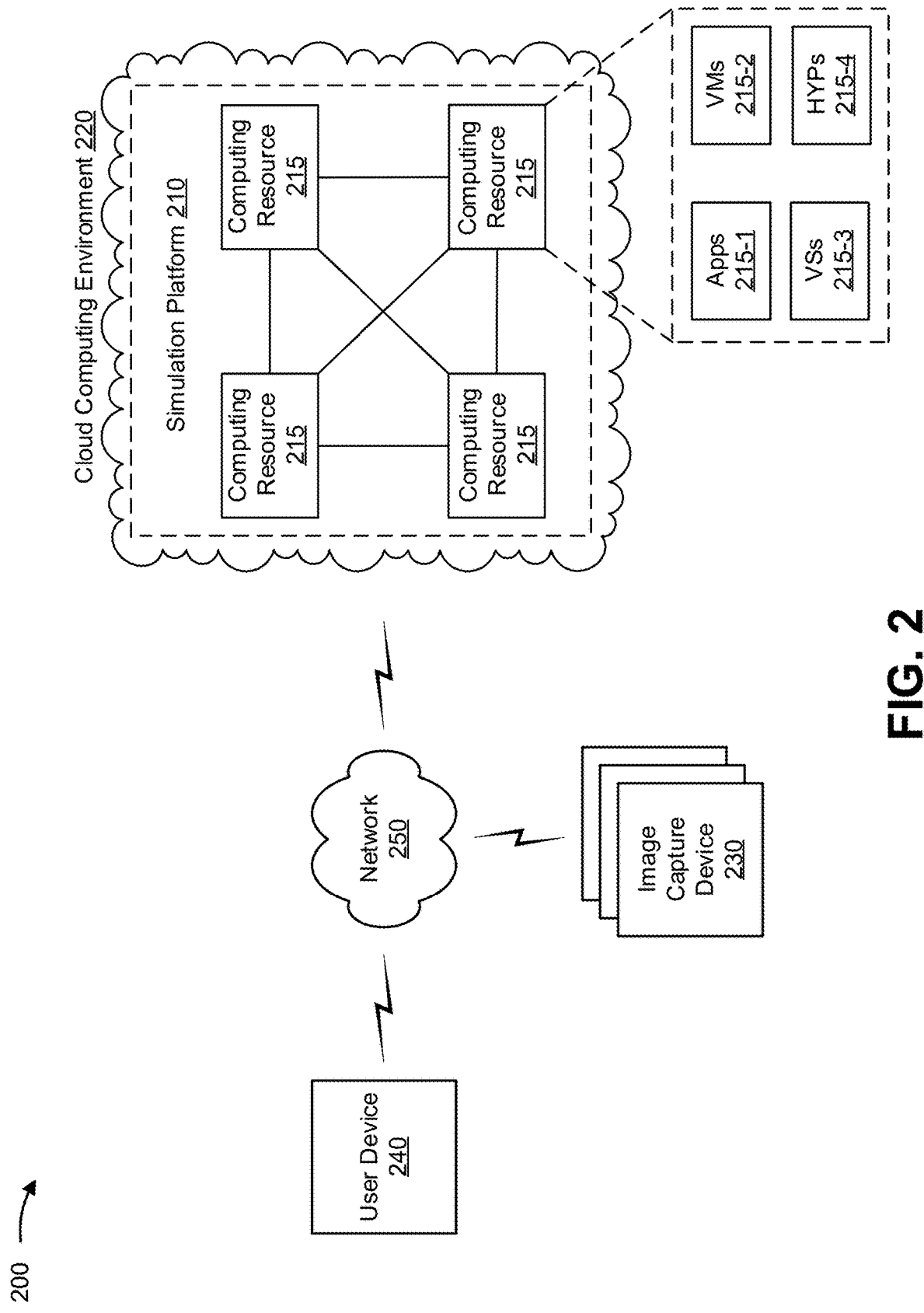
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a simulation platform 210, a computing resource 215, a cloud computing environment 220, one or more image capture devices 230 (referred to herein individually as "image capture device 230" or collectively as "image capture devices 230"), a user device 240, and a network 250. Devices of environment 200 may interconnect via wired connections, wireless connections, or a combination of wired and wireless connections.

Simulation platform 210 includes one or more computing resources assigned to detect and/or determine information associated with objects within a scene and/or involved in an event. For example, simulation platform 210 may be a platform implemented by cloud computing environment 220 that may monitor image streams, detect an event or incident depicted in the image streams, and/or reenact the event or incident, as described herein. In some implementations, simulation platform 210 is implemented by computing resources 215 of cloud computing environment 220.

Simulation platform 210 may include a server device or a group of server devices. In some implementations, simulation platform 210 may be hosted in cloud computing environment 220. Notably, while implementations described herein describe simulation platform 210 as being hosted in cloud computing environment 220, in some implementations, simulation platform 210 may be non-cloud-based or may be partially cloud-based.

Cloud computing environment 220 includes an environment that delivers computing as a service, whereby shared resources, services, etc. may be provided to user devices 240. Cloud computing environment 220 may provide computation, software, data access, storage, and/or other services that do not require end-user knowledge of a physical location and configuration of a system and/or a device that delivers the services. As shown, cloud computing environment 220 may include simulation platform 210 and computing resource 215.

Computing resource 215 includes one or more personal computers, workstation computers, server devices, or another type of computation and/or communication device. In some implementations, computing resource 215 may host simulation platform 210. The cloud resources may include compute instances executing in computing resource 215, storage devices provided in computing resource 215, data transfer devices provided by computing resource 215, etc. In some implementations, computing resource 215 may communicate with other computing resources 215 via wired connections, wireless connections, or a combination of wired and wireless connections.

As further shown in FIG. 2, computing resource 215 may include a group of cloud resources, such as one or more applications ("APPs") 215-1, one or more virtual machines ("VMs") 215-2, virtualized storage ("VSs") 215-3, one or more hypervisors ("HYPs") 215-4, or the like.

Application 215-1 includes one or more software applications that may be provided to or accessed by user device 240. Application 215-1 may eliminate a need to install and execute the software applications on user device 240. For example, application 215-1 may include software associated with simulation platform 210 and/or any other software capable of being provided via cloud computing environment 220. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program and may support a single process. In some implementations, virtual machine 215-2 may execute on behalf of a user (e.g., user device 240), and may manage infrastructure of cloud computing environment 220, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 provides hardware virtualization techniques that allow multiple operating systems (e.g., "guest operating systems") to execute concurrently on a host computer, such as computing resource 215. Hypervisor 215-4 may present a virtual operating platform to the guest operating systems and may manage the execution of the guest operating systems. Multiple instances of a variety of operating systems may share virtualized hardware resources.

Image capture device 230 includes one or more devices capable of capturing, storing, and/or providing an image, as described herein. Image capture device 230 may include one or more cameras, one or more sensors (e.g., motion sensors, infrared sensors, temperature sensors, and/or the like), one or more mechanical devices, and/or the like that may be used to capture images of a scene or an event at any desirable angle from a location (e.g., geographical location) of image capture device 230.

User device 240 includes one or more devices capable of receiving, generating, storing, processing, providing, and/or presenting information or simulations associated with analyzing events and/or incidents detected by the simulation platform. For example, user device 240 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
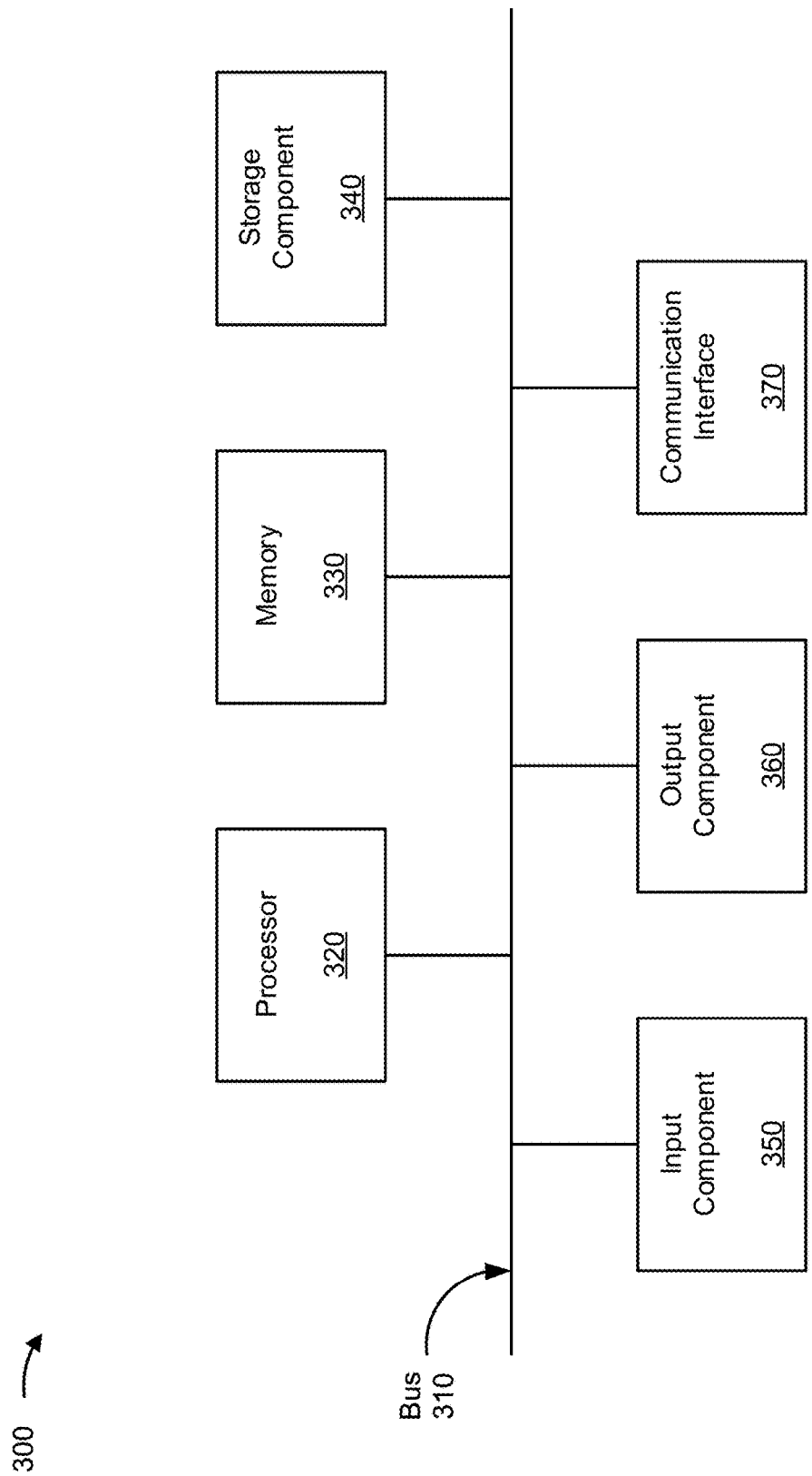
FIG. 3 is a diagram of example components of one or more devices of FIG. 2.

FIG. 3 is a diagram of example components of a device 300. Device 300 may correspond simulation platform 210, computing resource 215, image capture device 230, and/or user device 240. In some implementations, simulation platform 210, computing resource 215, image capture device 230, and/or user device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for monitoring a scene to analyze an event using a plurality of image streams. In some implementations, one or more process blocks of FIG. 4 may be performed by a simulation platform (e.g., simulation platform 210). In some implementations, one or more process blocks of FIG. 4 may be performed by another device or a group of devices separate from or including a simulation platform, such as a computing resource (e.g., computing resource 215), an image capture device (e.g., image capture device 230), and a user device (e.g., user device 240)

As shown in FIG. 4, process 400 may include receiving, from a plurality of image capture devices, a plurality of image streams that depict an event, wherein the plurality of image capture devices are located at different geographical positions in an area of the event (block 410). For example, the simulation platform (e.g., using computing resource 215, processor 320, memory 330, storage component 340, input component 350, output component 360, and communication interface 370, and/or the like) may receive, from a plurality of image capture devices, a plurality of image streams that depict an event, as described above. In some implementations, the plurality of image capture devices are located at different geographical positions in an area of the event.

As further shown in FIG. 4, process 400 may include identifying, using an object detection model, an object that is depicted in each of the plurality of image streams, wherein the object is involved in the event (block 420). For example, the simulation platform (e.g., using computing resource 215, processor 320, memory 330, storage component 340, input component 350, output component 360, and communication interface 370, and/or the like) may identify, using an object detection model, an object that is depicted in each of the plurality of image streams, as described above. In some implementations, the object is involved in the event.

As further shown in FIG. 4, process 400 may include determining, for each of the plurality of image streams, respective image-based coordinates of a path associated with the object during the event, wherein the respective image-based coordinates are determined based on a respective geographical position of a respective image capture device and a path of the object that is depicted in the respective image stream (block 430). For example, the simulation platform (e.g., using computing resource 215, processor 320, memory 330, storage component 340, input component 350, output component 360, and communication interface 370, and/or the like) may determine, for each of the plurality of image streams, respective image-based coordinates of a path associated with the object during the event, as described above. In some implementations, the respective image-based coordinates are determined based on a respective geographical position of a respective image capture device and a path of the object that is depicted in the respective image stream.

As further shown in FIG. 4, process 400 may include determining, based on the respective image-based coordinates and timestamps of the plurality of image streams, simulation coordinates associated with a path of the object during the event, wherein the simulation coordinates correspond to the area of the event (block 440). For example, the simulation platform (e.g., using computing resource 215, processor 320, memory 330, storage component 340, input component 350, output component 360, and communication interface 370, and/or the like) may determine, based on the respective image-based coordinates and timestamps of the plurality of image streams, simulation coordinates associated with a path of the object during the event, as described above. In some implementations, the simulation coordinates correspond to the area of the event.

As further shown in FIG. 4, process 400 may include detecting, based on the simulation coordinates, that the object is involved in a collision during the event (block 450). For example, the simulation platform (e.g., using computing resource 215, processor 320, memory 330, storage component 340, input component 350, output component 360, and communication interface 370, and/or the like) may detect, based on the simulation coordinates, that the object is involved in a collision during the event, as described above.

As further shown in FIG. 4, process 400 may include performing an action associated with detecting that the object is involved in the collision. (block 460). For example, the simulation platform (e.g., using computing resource 215, processor 320, memory 330, storage component 340, input component 350, output component 360, and communication interface 370, and/or the like) may perform an action associated with detecting that the object is involved in the collision, as described above.

Process 400 may include additional implementations, such as any single implementation or any combination of implementations described below and/or in connection with one or more other processes described elsewhere herein.

In a first implementation, to detect that the object is a same object that is depicted in the plurality of image streams, the object detection model may determine that a first image stream, of the plurality of image streams, depicts a first moving object that is associated with a movement characteristic; determine that a second image stream, of the plurality of image streams, depicts a second moving object that is associated with the movement characteristic; and detect, based on both the first moving object and the second moving object having the movement characteristic, that the first moving object and the second moving object are the same object.

In a second implementation, alone or in combination with the first implementation, the object is a first object and the collision involves a second object associated with the event, and the simulation platform, when performing the action, may generate a three-dimensional simulation of the event, based on the simulation coordinates, that enables the collision to be analyzed from a plurality of different perspectives of the area.

In a third implementation, alone or in combination with one or more of the first and second implementations, the respective image-based coordinates are two-dimensional (2D) coordinates and the simulation coordinates are three-dimensional (3D) coordinates.

In a fourth implementation, alone or in combination with one or more of the first through third implementations, the simulation coordinates are determined based on combining the respective image-based coordinates and mapping combinations of the respective image-based coordinates to a coordinate system associated with the simulation coordinates, wherein the coordinate system is defined by the area of the event.

In a fifth implementation, alone or in combination with one or more of the first through fourth implementations, the simulation platform, when performing the action, may send, in real-time relative to the event, a notification to a user device to indicate that the collision occurred, wherein the user device is used to monitor the area.

Additionally, or alternatively, a process may include receiving a first image stream that depicts a scene during a time period, wherein the first image stream is captured, by a first image capture device, from a first geographical position associated with the scene during the time period. For example, the simulation platform (e.g., using computing resource 215, processor 320, memory 330, storage component 340, input component 350, output component 360, and communication interface 370, and/or the like) may receive a first image stream that depicts a scene during a time period, as described above. In some implementations, the first image stream is captured, by a first image capture device, from a first geographical position associated with the scene during the time period.

Such a process may further include receiving a second image stream that depicts the scene, wherein the second image stream is captured, by a second image capture device, from a second geographical position associated with the scene that is different from the first geographical position. For example, the simulation platform (e.g., using computing resource 215, processor 320, memory 330, storage component 340, input component 350, output component 360, and communication interface 370, and/or the like) may receive a second image stream that depicts the scene, as described above. In some implementations, the second image stream is captured, by a second image capture device, from a second geographical position associated with the scene that is different from the first geographical position.

Such a process may further include receiving metadata associated with the first image stream and the second image stream, wherein the metadata includes first geographical position information that identifies the first geographical position and second geographical position information that identifies the second geographical position. For example, the simulation platform (e.g., using computing resource 215, processor 320, memory 330, storage component 340, input component 350, output component 360, and communication interface 370, and/or the like) may receive metadata associated with the first image stream and the second image stream, as described above. In some implementations, the metadata includes first geographical position information that identifies the first geographical position and second geographical position information that identifies the second geographical position.

Such a process may further include identifying, using an object detection model, a vehicle that is depicted in the first image stream. For example, the simulation platform (e.g., using computing resource 215, processor 320, memory 330, storage component 340, input component 350, output component 360, and communication interface 370, and/or the like) may identify, using an object detection model, a vehicle that is depicted in the first image stream, as described above.

Such a process may further include determining, based on the first geographical position information, first image-based coordinates associated with a path of the vehicle, wherein the first image-based coordinates are determined based on the first image stream and the first geographical position. For example, the simulation platform (e.g., using computing resource 215, processor 320, memory 330, storage component 340, input component 350, output component 360, and communication interface 370, and/or the like) may determine, based on the first geographical position information, first image-based coordinates associated with a path of the vehicle, as described above. In some implementations, the first image-based coordinates are determined based on the first image stream and the first geographical position.

Such a process may further include determining, using the object detection model, that the vehicle is depicted in the second image stream. For example, the simulation platform (e.g., using computing resource 215, processor 320, memory 330, storage component 340, input component 350, output component 360, and communication interface 370, and/or the like) may determine, using the object detection model, that the vehicle is depicted in the second image stream, as described above.

Such a process may further include determining, based on the second geographical position information, second image-based coordinates associated with the path of the vehicle, wherein the second image-based coordinates are determined based on the second image stream and the second geographical position. For example, the simulation platform (e.g., using computing resource 215, processor 320, memory 330, storage component 340, input component 350, output component 360, and communication interface 370, and/or the like) may determine, based on the second geographical position information, second image-based coordinates associated with the path of the vehicle, as described above. In some implementations, the second image-based coordinates are determined based on the second image stream and the second geographical position.

Such a process may further include determining, based on the first image-based coordinates and the second image-based coordinates, simulation coordinates of the path, wherein the simulation coordinates correspond to 3D coordinates of the scene. For example, the simulation platform (e.g., using computing resource 215, processor 320, memory 330, storage component 340, input component 350, output component 360, and communication interface 370, and/or the like) may determine, based on the first image-based coordinates and the second image-based coordinates, simulation coordinates of the path, as described above. In some implementations, the simulation coordinates correspond to 3D coordinates of the scene.

Such a process may further include generating, based on the simulation coordinates, a 3D graphical simulation of the path of the vehicle, during the time period, within the scene. For example, the simulation platform (e.g., using computing resource 215, processor 320, memory 330, storage component 340, input component 350, output component 360, and communication interface 370, and/or the like) may generate, based on the simulation coordinates, a 3D graphical simulation of the path of the vehicle, during the time period, within the scene, as described above.

Such a process may further include performing an action associated with the 3D graphical simulation. For example, the simulation platform (e.g., using computing resource 215, processor 320, memory 330, storage component 340, input component 350, output component 360, and communication interface 370, and/or the like) may perform an action associated with the 3D graphical simulation, as described above.

Such a process may include additional implementations, such as any single implementation or any combination of implementations described below and/or in connection with one or more other processes described elsewhere herein.

In a first implementation, the vehicle is determined to be in the second image stream based on identifying the vehicle in the first image stream. In a second implementation, alone or in combination with the first combination, the object detection model comprises a machine learning model that is trained to detect the vehicle based on historical information associated with detecting one or more other vehicles.

In a third implementation, alone or in combination with one or more of the first and second implementations, the simulation coordinates are determined based on synchronizing the first image stream and the second image stream according to first timestamps of the first image stream and second timestamps of the second image stream, and the first timestamps and the second timestamps correspond to the time period.

In a fourth implementation, alone or in combination with one or more of the first through third implementations, the first image-based coordinates and the second image-based coordinates are 2D coordinates. In a fifth implementation, alone or in combination with one or more of the first through fourth implementations, the simulation platform, when performing the action, may at least one of cause the 3D graphical simulation to be presented via a display device, transmit the 3D graphical simulation to a user device, or store the 3D graphical simulation in a storage device.

In a sixth implementation, alone or in combination with one or more of the first through fifth implementations, the simulation platform, when performing the action, may detect, based on the 3D graphical simulation, a traffic event involving the vehicle and transmit, to a user device, a notification to indicate that the traffic event occurred at the intersection.

Additionally, or alternatively, a process may include receiving a plurality of image streams that depict a traffic event, wherein the plurality of image streams are captured by a plurality of traffic cameras in different geographical positions of an area of the event. For example, the simulation platform (e.g., using computing resource 215, processor 320, memory 330, storage component 340, input component 350, output component 360, and communication interface 370, and/or the like) may receive a plurality of image streams that depict a traffic event, as described above. In some implementations, the plurality of image streams are captured by a plurality of traffic cameras in different geographical positions of an area of the event.

Such a process may further include identifying, using an object detection model, a vehicle that is depicted in each of the plurality of image streams, wherein the vehicle is involved in the traffic event. For example, the simulation platform (e.g., using computing resource 215, processor 320, memory 330, storage component 340, input component 350, output component 360, and communication interface 370, and/or the like) may identify, using an object detection model, a vehicle that is depicted in each of the plurality of image streams, as described above. In some implementations, the vehicle is involved in the traffic event.

Such a process may further include determining, for each of the plurality of image streams, respective image-based coordinates of a path associated with the vehicle during the traffic event, wherein the respective image-based coordinates are determined based on a respective geographical position of a respective traffic camera and a path of the vehicle that is depicted in the respective image stream. For example, the simulation platform (e.g., using computing resource 215, processor 320, memory 330, storage component 340, input component 350, output component 360, and communication interface 370, and/or the like) may determine, for each of the plurality of image streams, respective image-based coordinates of a path associated with the vehicle during the traffic event, as described above. In some implementations, the respective image-based coordinates are determined based on a respective geographical position of a respective traffic camera and a path of the vehicle that is depicted in the respective image stream.

Such a process may further include determining, based on the respective image-based coordinates for each of the plurality of image streams, simulation coordinates associated with a path of the vehicle during the traffic event, wherein the simulation coordinates correspond to a 3D space associated with the different geographical positions. For example, the simulation platform (e.g., using computing resource 215, processor 320, memory 330, storage component 340, input component 350, output component 360, and communication interface 370, and/or the like) may determine, based on the respective image-based coordinates for each of the plurality of image streams, simulation coordinates associated with a path of the vehicle during the traffic event, as described above. In some implementations, the simulation coordinates correspond to a 3D space associated with the different geographical positions.

Such a process may further include detecting, based on the simulation coordinates, a traffic incident associated with the vehicle during the traffic event. For example, the simulation platform (e.g., using computing resource 215, processor 320, memory 330, storage component 340, input component 350, output component 360, and communication interface 370, and/or the like) may detect, based on the simulation coordinates, a traffic incident associated with the vehicle during the traffic event, as described above.

Such a process may further include performing an action associated with the traffic incident. For example, the simulation platform (e.g., using computing resource 215, processor 320, memory 330, storage component 340, input component 350, output component 360, and communication interface 370, and/or the like) may perform an action associated with the traffic incident, as described above.

Such a process may include additional implementations, such as any single implementation or any combination of implementations described below and/or in connection with one or more other processes described elsewhere herein.

In a first implementation, the vehicle is a first vehicle, the respective image-based coordinates are first respective image-based coordinates, the simulation coordinates are first simulation coordinates, and the simulation platform may identify, using the object detection model, a second vehicle depicted in each of the plurality of image streams, wherein the second vehicle is involved in the traffic event; determine, for each of the plurality of image streams, respective second image-based coordinates of a path associated with the second vehicle during the traffic event, wherein the second respective image-based coordinates are determined based on respective geographical positions of the plurality of traffic cameras and a path of the second vehicle that is depicted in the respective image stream; determine, based on the second respective image-based coordinates for each of the plurality of image streams, second simulation coordinates associated with a path of the second vehicle during the traffic event, wherein the second simulation coordinates correspond to the 3D space associated with the traffic event; detect, based on the second simulation coordinates, that the traffic incident involves the second vehicle.

In a second implementation, alone or in combination with the first implementation, the simulation platform, when detecting that the traffic incident involves the second vehicle, may determine that the path of the first vehicle and the path of the second vehicle include a point of intersection, and determine that the traffic incident involved the first vehicle and the second vehicle colliding, based on the first vehicle and the second vehicle being within a threshold distance of the point of intersection at a same time.

In a third implementation, alone or in combination with one or more of the first and second implementations, the object detection model comprises a machine learning model that is trained to detect a vehicle in the plurality of image streams, and the machine learning model is trained based on training images that depict a plurality of vehicles. In a fourth implementation, alone or in combination with one or more of the first through third implementations, the simulation coordinates are further determined based on synchronizing the respective image-based coordinates according to timestamps associated with the plurality of image streams.

In a fifth implementation, alone or in combination with one or more of the first through fourth implementations, the simulation platform, when performing the action, may generate, based on the simulation coordinates, a 3D graphical simulation of the traffic incident, control a traffic control device in the area of the traffic event, or transmit, to a user device, a notification associated with the traffic incident. In a sixth implementation, alone or in combination with one or more of the first through fifth implementations, the traffic incident is detected in real-time relative to the traffic event.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device and from a plurality of image capture devices, a plurality of image streams that depict a scene;
    determining, by the device and based on comparing movement characteristics associated with one or more objects depicted in each of the plurality of image streams, whether the one or more objects, associated with different image streams of the plurality of image streams, are the same object;
    mapping, by the device and based on determining whether the one or more objects are the same object, a first object of the one or more objects, associated with a first image stream of the plurality of image streams, to a second object of the one or more objects, associated with a second image stream of the plurality of image streams;
    determining, by the device, based on the mapping, and for each of the plurality of image streams, respective image-based coordinates of a path associated with the one or more objects,
        wherein the respective image-based coordinates are associated with a frame location of the one or more objects in one or more images of the plurality of image streams;
    determining, by the device and based on the respective image-based coordinates and timestamps of the plurality of image streams, simulation coordinates associated with the path;
    detecting, by the device and based on the simulation coordinates, that the one or more objects are involved in a traffic event associated with the scene; and
    performing, by the device and based on detecting that that the one or more objects are involved in the traffic event, an action.

2. The method of claim 1, wherein the action is at least one of:
    controlling a traffic control device, or
    transmitting a notification associated with the traffic event.

3. The method of claim 1, wherein the respective image-based coordinates are determined based on a respective geographical position of a respective image capture device, of the plurality of image capture devices, and a path of the one or more objects that is depicted in a respective image stream, of the plurality of image streams.

4. The method of claim 1, further comprising:
    receiving metadata associated with the plurality of image streams,
        wherein the metadata includes information associated with the movement characteristics associated with the one or more objects.

5. The method of claim 1, wherein the simulation coordinates are determined based on synchronizing the respective image-based coordinates according to the timestamps.

6. The method of claim 1, further comprising:
    generating, based on the simulation coordinates, a graphical simulation of the traffic event.

7. The method of claim 1, wherein mapping the first object of the one or more objects, associated with a first image stream of the plurality of image streams, to the second object of the one or more objects, associated with a second image stream of the plurality of image streams comprises:
using an object detection model that is trained to detect the first object and the second object based on historical information associated with detecting one or more other objects.

8. A device, comprising:
one or more memories; and
one or more processors communicatively coupled to the one or more memories, configured to:
receive, from a plurality of image capture devices, a plurality of image streams that depict a scene;
determine, based on comparing movement characteristics associated with one or more objects depicted in each of the plurality of image streams, whether the one or more objects, associated with different image streams of the plurality of image streams, are the same object;
map, based on determining whether the one or more objects are the same object, a first object of the one or more objects, associated with a first image stream of the plurality of image streams, to a second object of the one or more objects, associated with a second image stream of the plurality of image streams;
determine, based on the mapping, for each of the plurality of image streams, respective image-based coordinates of a path associated with the one or more objects,
wherein the respective image-based coordinates are associated with a frame location of the one or more objects in one or more images of the plurality of image streams;
determine, based on the respective image-based coordinates and timestamps of the plurality of image streams, simulation coordinates associated with the path;
detect, based on the simulation coordinates, that the one or more objects are involved in a traffic event associated with the scene; and
perform, based on detecting that that the one or more objects are involved in the traffic event, an action.

9. The device of claim 8, wherein the action is at least one of:
controlling a traffic control device, or
transmitting a notification associated with the traffic event.

10. The device of claim 8, wherein the respective image-based coordinates are determined based on a respective geographical position of a respective image capture device, of the plurality of image capture devices, and a path of the one or more objects that are depicted in a respective image stream, of the plurality of image streams.

11. The device of claim 8, wherein the one or more processors are configured to:
receive metadata associated with the plurality of image streams,
wherein the metadata includes information associated with the movement characteristics associated with the one or more objects.

12. The device of claim 8, wherein the simulation coordinates are determined based on synchronizing the respective image-based coordinates according to the timestamps.

13. The device of claim 8, wherein the same object is a first vehicle; and
wherein the one or more processors are configured to:
determine that the traffic event involved a second vehicle; and
determine, based on the first vehicle and the second vehicle being within a threshold distance of a point of intersection at a same time, that the traffic event involved the first vehicle and the second vehicle colliding.

14. A non-transitory computer-readable medium storing instructions, the instructions comprising:
one or more instructions that, when executed by one or more processors, cause the one or more processors to:
receive, from a plurality of image capture devices, a plurality of image streams that depict a scene;
determine, based on comparing movement characteristics associated with one or more objects depicted in each of the plurality of image streams, whether the one or more objects, associated with different image streams of the plurality of image streams, are the same object;
map, based on determining whether the one or more objects are the same object, a first object of the one or more objects, associated with a first image stream of the plurality of image streams, to a second object of the one or more objects, associated with a second image stream of the plurality of image streams;
determine, based on the mapping, and for each of the plurality of image streams, respective image-based coordinates of a path associated with one or more objects,
wherein the respective image-based coordinates are associated with a frame location of the one or more objects in one or more images of the plurality of image streams;
determine, based on the respective image-based coordinates and timestamps of the plurality of image streams, simulation coordinates associated with the path;
detect, based on the simulation coordinates, that the one or more objects are involved in a traffic event associated with the scene; and
perform, based on detecting that that the one or more objects are involved in the traffic event, an action.

15. The non-transitory computer-readable medium of claim 14, wherein the action is at least one of:
controlling a traffic control device, or
transmitting a notification associated with the traffic event.

16. The non-transitory computer-readable medium of claim 14, wherein the respective image-based coordinates are determined based on a respective geographical position of a respective image capture device, of the plurality of image capture devices, and a path of the one or more objects that is depicted in a respective image stream, of the plurality of image streams.

17. The non-transitory computer-readable medium of claim 14, wherein the one or more instructions, when executed by the one or more processors, further cause the one or more processors to:
receive metadata associated with the plurality of image streams,
wherein the metadata includes information associated with the movement characteristics associated with the one or more objects.

18. The non-transitory computer-readable medium of claim 14, wherein the simulation coordinates are determined based on synchronizing the respective image-based coordinates according to the timestamps.

19. The device of claim 8, wherein the movement characteristics include at least one of:
- coordinates associated with the one or more objects,
- speed associated with the one or more objects, or
- direction of travel associated with the one or more objects.

20. The device of claim 8, further comprising:
monitoring whether the simulation coordinates indicate that a particular object of the one or more objects are within a threshold distance of another object of the one or more objects.

\* \* \* \* \*